United States Patent Office 2,910,476
Patented Oct. 27, 1959

2,910,476
PROCESS FOR PREPARING BENZOTHIADIAZINE-1,1-DIOXIDES

Frederick C. Novello, Lansdale, Pa., assignor to Merck & Co., Inc., Rahway, N.J., a corporation of New Jersey No Drawing. Application September 13, 1957
Serial No. 683,724

4 Claims. (Cl. 260—243)

This invention is concerned with a novel method for the preparation of benzothiadiazine-1,1-dioxide compounds which contain a sulfamyl substituent in the benzenoid portion of the nucleus. The novel compounds which are prepared by the process of this invention possess diuretic properties and are the subject of my copending U.S. patent application, Serial No. 582,082, filed May 2, 1956, now U.S. Patent No. 2,809,194, of which the instant application is a continuation-in-part.

The novel process of this invention can be illustrated by the following reaction equation:

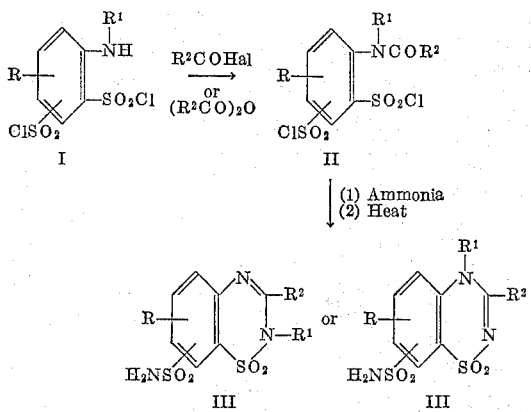

In the above reaction equation, the variable radical R is halogen, such as chlorine, bromine or fluorine, lower alkyl advantageously having from 1 to 5 carbon atoms, lower alkoxy also advantageously having from 1 to 5 carbon atoms in the alkyl portion of the radical and nitro groups; $R^1$ is hydrogen or a lower alkyl radical advantageously containing from 1 to 5 carbon atoms; and $R^2$ is hydrogen, a lower alkyl preferably having from 1 to 11 carbon atoms, or a mononuclear aryl or a mononuclear aryl-lower alkyl radical such as a phenyl, benzyl, styryl and the like or similar radicals substituted in the phenyl moiety by halogen, lower alkyl, or lower alkoxy and the like radicals.

The process of this invention comprises acylating the anilinedisulfonyl chloride compound, I, with an organic acid halide or an organic acid anhydrid to form the corresponding N-acyl compound, II, which then is treated with ammonia to convert the disulfonyl chloride groups to disulfamyl groups and then heating the N-acyl disulfamyl compound thus obtained to cyclize it to the benzothiadiazine compound, III.

While some of the anailinedisulfonyl chloride starting materials employed in the process of this invention are known compounds, those which are not known can be prepared from the appropriate aniline by the method described in my copending application, Serial No. 582,082. In general the method provides that the aniline be chlorosulfonated in the presence of an alkali metal halide, such as sodium chloride, preferably by adding the aniline compound portionwise to the chlorosulfonic acid as the reaction between these ingredients is quite vigorous. After all the aniline derivative has been added, the alkali metal halide is added in small portions to allow for the evolution of hydrogen halide at a moderate rate. Following this, the mixture is heated at between about 100–200° C., preferably in an oil bath.

The acylation of the disulfonyl chloride compound, I, can be carried out at room temperature or, if desired, by warming. At least a molar equivalent of the acylating reagent is employed in the reaction although an excess of the acylating reagent can be used if it is desired to have this reactant serve as a solvent for compound I as well. If because of cost or limited availability of the acylating agent it is desired to use another solvent in the reaction mixture, this can, of course, be done. Suitable solvents include benzene, toluene, xylene, dioxane or other inert organic solvents which will dissolve compound I without interfering in any way with the acylating reaction. The organic acid halide or organic acid anhydride acylating agent is advantageously derived from an acid selected from a lower alkanoic acid such as formic acid, acetic acid, propionic acid, caproic acid, capric acid, lauric acid and the like, or a mononuclear aryl-monocarboxylic acid or a mononuclear aryl-lower alkanoic acid such as benzoic acid, phenylacetic acid, phenylpropionic acid, cinnamic acid, and the like.

The N-acyl derivative, II, then is converted to the disulfamyl derivative by treatment with ammonia. At least four molecular equivalents of ammonia is employed in this reaction in order to replace each of the chlorine atoms in the sulfonyl chloride groups and to take up the liberated HCl. Ammonia in substantially any form can be employed in this reaction such as liquid ammonia, concentrated ammonium hydroxide, alcoholic ammonia or ammonia gas. This reaction also proceeds at room temperature and when completed the disulfamyl compound formed is heated at between about 150–250° C. to produce the cyclized product, III.

The benzothiadiazine-1,1-dioxide compound, III, prepared by the novel process of this invention is tautomeric when $R^1$ is hydrogen, that is the double bond exists either between the 2- and 3-position atoms of the nucleus or it exists between the atoms in the 3- and 4-positions. However, in those compounds wherein $R^1$ is a lower alkyl radical attached to the nitrogen in the 4-position, the double bond exists between positions 2 and 3.

The benzothiadiazine - 1,1 - dioxide compounds prepared by the process of this invention as well as the intermediate disulfamyl compounds are useful chemotherapeutic agents particularly because of their diuretic and/or natriuretic properties. As these compounds can be administered orally or parenterally, they can be compounded by conventional means in the form of tablets or solutions suitable for administration by the selected route.

The process of this invention is more fully described in the following examples. It is to be understood, however, that the examples are illustrative of the various compounds that can be prepared by the process of this invention and are not to be construed as limiting the invention to the preparation of the particular compounds specifically described.

EXAMPLE 1

*6-chloro-3-methyl-7-sulfamyl-1,2,4-benzothiadiazine-1,1-dioxide*

A solution of 5 g. of 5-chloroaniline-2,4-disulfonyl chloride in 15 ml. of acetic anhydride is allowed to stand at room temperature for 45 minutes. After cooling, the crystalline product is collected, treated with 50 ml. of 10% alcoholic ammonia and evaporated to dryness on the steam bath. The residue then is heated at 200° C.

for 2 hours, cooled and recrystallized from dilute alcohol to give 6-chloro-3-methyl-7-sulfamyl-1,2,4-benzothiadiazine-1,1-dioxide as colorless needles, M.P. 332–333° C.

EXAMPLE 2

*6-chloro-3-phenyl-7-sulfamyl-1,2,4-benzothiadiazine-1,1-dioxide*

STEP A

A solution of 6.6 g. of 5-chloroaniline-2,4-disulfonyl chloride in 10 ml. of benzoyl chloride is allowed to stand at room temperature for 17 hours. The crystalline product is collected, washed with a small amount of benzene and crystallized from benzene-hexane to give N-benzoyl-5-chloroaniline-2,4-disulfonyl chloride as colorless needles, M.P. 171–173° C. (dec.).

STEP B

N-benzoyl-5-chloroaniline-2,4-disulfonyl chloride (7.4 g.) is added to excess liquid ammonia (50–75 ml.) and allowed to evaporate to dryness at room temperature. The residue, which can be crystallized from dilute alcohol to afford N-benzoyl-5-chloro-2,4-disulfamylaniline, M.P. 266° C. (dec.), is heated at 200° C. for 2 hours, cooled and dissolved in 50 ml. of 5% aqueous sodium hydroxide and filtered. After acidification of the filtrate with dilute hydrochloric acid, the product is collected, washed with water and recrystallized from a dimethylformamide-water mixture. 6-chloro-3-phenyl-7-sulfamyl-2,2,4-benzothiadiazine-1,1-dioxide is thus obtained as colorless flakes, M.P. greater than 350° C.

EXAMPLE 3

*6-chloro-3-propyl-7-sulfamyl-1,2,4-benzothiadiazine-1,1-dioxide*

STEP A

A solution of 5.4 g. of 5-chloroaniline-2,4-disulfonyl chloride in a mixture of 10 ml. of butyric anhydride and 10 ml. of benzene is allowed to stand at room temperature for 1 hour. After cooling in an ice bath, the crystalline product is collected and crystallized from benzene-hexane to give N-butyryl-5-chloroaniline-2,4-disulfonyl chloride as colorless needles, M.P. 121–122° C.

STEP B

N-butyryl-5-chloroaniline-2,4,-disulfonyl chloride (9.9 g.) is added portionwise to excess liquid ammonia (100 ml.) and allowed to evaporate to dryness at room temperature. The residue is dissolved in water and the solution acidified with dilute hydrochloric acid. The precipitate is collected and crystallized from dilute alcohol to give 6-chloro-3-propyl-7-sulfamyl-1,2,4-benzothiadiazine-1,1-dioxide as colorless needles, M.P. 302.5–303.5° C.

EXAMPLE 4

*3-amyl-6-chloro-7-sulfamyl-1,2,4-benzothiadiazine-1,1-dioxide*

STEP A 5-chloroaniline-2,4-disulfonyl chloride (5 g.) is dissolved in 10 ml. of n-caproic anhydride by warming gently on the steam bath and allowed to stand at room temperature for 2 hours. The crystalline product is collected and recrystallized from hexane to give N-caproyl-5-chloroaniline-2,4-disulfonyl chloride as colorless needles, M.P. 91–93° C.

STEP B

A solution of 5.2 g. of N-caproyl-5-chloroaniline-2,4-disulfonyl chloride in 25 ml. of 28% ammonium hydroxide is heated on the steam bath for 1½ hours, cooled, and acidified with dilute hydrochloric acid. The precipitate is collected and crystallized from dilute alcohol to give 3 - amyl-6-chloro-7-sulfamyl-1,2,4-benzothiadiazine-1,1-dioxide as colorless plates, M.P. 269–270° C.

EXAMPLE 5

*3-benzyl-6-fluoro-7-sulfamyl-1,2,4-benzothiadiazine-1,1-dioxide*

STEP A m-Fluoroaniline (0.5 mole) is added dropwise with stirring to 375 ml. of chlorosulfonic acid in a 3 liter, round bottom, 3-necked flask, cooled in an ice bath. Sodium chloride (350 g.) is added portionwise over a period of 1–2 hours and the mixture then heated gradually in an oil bath to 150° C. After 3 hours at 150–160° C., the flask is cooled thoroughly in an ice bath and the contents treated with a liter of cold water. The product is extracted with ether and the extract washed with water and dried over sodium sulfate. After removal of ether on the steam bath, the residue is recrystallized from benzene-hexane yielding 5-fluoroaniline-2,4-disulfonyl chloride.

STEP B

The thus obtained 5-fluoroaniline-2,4-disulfonyl chloride is dissolved in phenylacetyl chloride and allowed to stand at room temperature for 17 hours. The product is collected and washed with benzene to give N-phenylacetyl-5-fluoroaniline-2,4-disulfonyl chloride.

STEP C

The above product then is added to excess liquid ammonia and allowed to evaporate to dryness at room temperature. The residue is heated at 200° C. for 3 hours, cooled and the residue crystallized from dilute alcohol to give 3-benzyl-6-fluoro-7-sulfamyl-1,2,4-benzothiadiazine-1,1-dioxide.

EXAMPLE 6

*6-butyl-4-propyl-7-sulfamyl-3-undecyl-1,2,4-benzothiadiazine-1,1-dioxide*

By replacing the m-fluoroaniline employed in Step A of Example 5 by an equimolecular quantity of m-butyl-N-propylaniline and following substantially the same chlorosulfonation procedure described in Step A of Example 5, there is obtained 5-butyl-N-propylaniline-2,4-disulfonyl chloride. Five grams of the thus obtained disulfonyl chloride is dissolved in lauroyl chloride (10 ml.) and heated briefly on the steam bath. The reaction mixture then is allowed to cool to room temperature and the solid product thus formed collected on the filter. After crystallization from a mixture of benzene-hexane, 5-butyl-N,N-lauroylpropylaniline-2,4-disulfonyl chloride is obtained. After separation by filtration, the disulfonyl chloride is added to 25 ml. of 28% ammonium hydroxide and heated for approximately 1½ hours on the steam bath. After cooling to room temperature, the reaction mixture is acidified with dilute hydrochloric acid and the solid product is collected on the filter, washed with water, dried and then heated at 200° C. for 1 hour yielding 6-butyl-4-propyl-7-sulfamyl-3-undecyl - 1,2,4 - benzothiadiazine-1,1-dioxide.

EXAMPLE 7

*6-propoxy-3-styryl-1,2,4-benzothiadiazine-1,1-dioxide*

By replacing the m-chloroaniline employed in Step A of Example 5 by an equimolecular quantity of m-propoxyaniline and following substantially the same chlorosulfonation procedure described in Step A of Example 5, there is obtained 5-propoxyaniline-2,4-disulfonyl chloride. Five grams of the thus obtained disulfonyl chloride is dissolved in 10 ml. of cinnamoyl chloride and heated briefly on the steam bath. The reaction mixture then is allowed to cool to room temperature and the solid product thus formed collected on the filter. After crystallization from a mixture of benzene and hexane, N-cinnamoyl-5-propoxyaniline-2,4-disulfonyl chloride is obtained. After separation by filtration, the disulfonyl chloride is added to 25 ml. of 28% ammonium hydroxide and heated for approximately 1½ hours on the steam bath. After cooling to room temperature, the reaction mixture is acidified with dilute hydrochloric acid and the solid product is collected on the filter, washed with water, dried and then heated at 200° C. for 1 hour yielding 6-propoxy-3-styryl-1,2,4-benzothiadiazine-1,1-dioxide.

EXAMPLE 8

6-methyl-3-phenyl-7-sulfamyl-1,2,4-benzothiadiazine-1,1-dioxide

STEP A

A solution of 6 g. of 5-methylaniline-2,4-disulfonyl chloride and 5 g. of benzoic acid anhydride in 50 ml. of anhydrous benzene is heated on the steam bath for 1 hour. Hexane then is added until incipient crystallization and the product allowed to crystallize, yielding N-benzoyl-5-methylaniline-2,4-disulfonyl chloride.

STEP B

By replacing the N-benzoyl-5-chloroaniline-2,4-disulfonyl chloride employed in Step B of Example 2 by an equimolecular quantity of the N-benzoyl-5-methylaniline 2,4-disulfonyl chloride, obtained as described above, and following substantially the same procedure described in Step B of Example 2, there is obtained 6-methyl-3-phenyl-7-sulfamyl-1,2,4-benzothiadiazine-1,1-dioxide.

EXAMPLE 9

3-benzyl-6-nitro-7-sulfamyl-1,2,4-benzothiadiazine-1,1-dioxide

STEP A

A solution of 6.7 g. of 5-nitroaniline-2,4-disulfonyl chloride and 5.1 g. of phenylacetic acid anhydride in 50 ml. of anhydrous benzene is heated on the steam bath for 1 hour. Hexane then is added to incipient crystallization and the product allowed to crystallize, yielding 5-nitro-N-phenylacetylaniline-2,4-disulfonyl chloride.

STEP B

By replacing the N-benzoyl-5-chloroaniline-2,4-disulfonyl chloride employed in Step B of Example 2 by an equimolecular quantity of the 5-nitro-N-phenylacetylaniline-2,4-disulfonyl chloride, obtained as described above, and following substantially the same procedure described in Step B of Example 2, there is obtained 3-benzyl - 6 - nitro - 7-sulfamyl-1,2,4-benzothiadiazine-1,1-dioxide.

EXAMPLE 10

6-chloro-7-sulfamyl-1,2,4-benzothiadiazine-1,1-dioxide

A solution of 3 g. of 5-chloroaniline-2,4-disulfonyl chloride in 10 ml. of formyl fluoride is allowed to stand at room temperature until all the excess formyl fluoride evaporates. To the residual solid is added 25 ml. of 28% ammonium hydroxide. The mixture is heated on the steam bath for 1 hour, cooled in an ice bath and the product collected on the filter and then recrystallized from dilute alcohol yielding 6-chloro-7-sulfamyl-1,2,4-benzothiadiazine-1,1-dioxide, M.P. 342.5–343° C.

While the above examples illustrate specific conditions for the preparation of benzothiadiazine-1,1-dioxide compounds, it is to be understood that slight modifications can be made in the reaction conditions described in the examples without departing from the scope of this invention as defined by the appended claims.

What is claimed is:

1. A process for preparing a benzothiadiazine-1,1-dioxide compound which comprises acylating an aniline disulfonyl chloride having the general formula

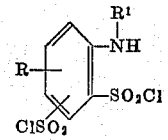

wherein R is selected from the group consisting of halogen, lower alkyl, lower alkoxy and nitro groups, and $R^1$ is selected from the group consisting of hydrogen and a lower alkyl radical, with at least one equivalent of a compound selected from the group consisting of a lower alkanoic acid halide, a lower alkanoic acid anhydride, a benzoyl halide, a benzoic acid anhydride, a phenyl-lower alkanoic acid halide and a phenyl-lower alkanoic acid anhydride at a temperature ranging between room temperature and heating on the steam bath, to form the N-acyl derivative which is amidated by reacting it at room temperature with at least four eqivalents of ammonia and then heated at a temperature ranging between room temperature and 250° C. to form the benzothiadiazine-1,1-dioxide compound having one of the general structures

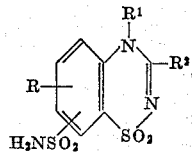

and

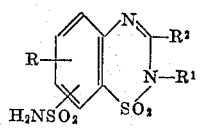

wherein R and $R^1$ have the meaning assigned to each of them above and $R^2$ is selected from the group consisting of hydrogen, lower alkyl, a phenyl and a phenyl-lower alkyl radical.

2. A process as claimed in claim 1, wherein cyclization of the disulfamyl compound is accomplished by heating the compound at a temperature between about 150–250° C.

3. A process as claimed in claim 1 wherein 5-chloroaniline-2,4-disulfonyl chloride is acylated with a lower alkanoic acid halide to form the N-alkanoyl derivative which is amidated with ammonia and then heated at between about 150–250° C. to form the corresponding 3 - $R^2$ - 6-chloro-7-sulfamyl-1,2,4-benzothiadiazine-1,1-dioxide wherein $R^2$ is the residue of the alkanoic acid halide stripped of its —COHalogen moiety.

4. A process as claimed in claim 1, wherein 5-chloroaniline-2,4-disulfonyl chloride is acylated with formyl fluoride and the product thus formed treated with ammonium hydroxide and then heated at between about 150–250° C. to form 6-chloro-7-sulfamyl-1,2,4-benzothiadiazine-1,1-dioxide.

No references cited.